United States Patent
Muenster et al.

(10) Patent No.: US 11,584,438 B2
(45) Date of Patent: Feb. 21, 2023

(54) VIRTUAL REALITY REMOTE VALET PARKING

(71) Applicant: Ford Global Technologies, LLC, Dearborn, MI (US)

(72) Inventors: Natalie Muenster, Dearborn, MI (US); Ravin Ratnakant Sardal, Dearborn, MI (US); Alexandru Mihai Gurghian, Dearborn, MI (US); Parsa Mahmoudieh, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/499,211

(22) Filed: Oct. 12, 2021

(65) Prior Publication Data

US 2022/0026902 A1 Jan. 27, 2022

Related U.S. Application Data

(62) Division of application No. 16/479,393, filed as application No. PCT/US2017/014980 on Jan. 25, 2017, now Pat. No. 11,220,291.

(51) Int. Cl.
*B62D 15/02* (2006.01)
*G05D 1/00* (2006.01)

(52) U.S. Cl.
CPC ....... *B62D 15/0285* (2013.01); *G05D 1/0016* (2013.01); *G05D 1/0022* (2013.01); *G05D 1/0038* (2013.01); *G05D 1/0055* (2013.01); *G05D 2201/0213* (2013.01)

(58) Field of Classification Search
CPC .... B62D 15/0285; B62D 1/00; G05D 1/0016; G05D 1/0022; G05D 1/0038; G05D 1/0055; G05D 2201/0213
USPC .......................................................... 701/2
See application file for complete search history.

(56) References Cited

U.S. PATENT DOCUMENTS

| | | | |
|---|---|---|---|
| 9,578,291 B2* | 2/2017 | DiPoala | H04N 7/183 |
| 2008/0059007 A1* | 3/2008 | Whittaker | G05D 1/0274 |
| | | | 701/2 |
| 2013/0246207 A1* | 9/2013 | Novak | G06Q 30/0641 |
| | | | 705/26.2 |
| 2014/0002648 A1 | 1/2014 | DiPoala | |
| 2015/0104071 A1* | 4/2015 | Martin | G08G 1/202 |
| | | | 382/104 |
| 2015/0178998 A1* | 6/2015 | Attard | G07C 5/008 |
| | | | 701/23 |
| 2015/0248131 A1* | 9/2015 | Fairfield | B60W 30/00 |
| | | | 701/2 |

(Continued)

OTHER PUBLICATIONS

Chinese Office Action for CN Application No. 201780084401.1 dated Mar. 9, 2022 (29 pages, with English translation).

*Primary Examiner* — Muhammad Shafi
(74) *Attorney, Agent, or Firm* — Brandon Hicks; Eversheds Sutherland (US) LLP

(57) ABSTRACT

Techniques and examples pertaining to virtual reality remote valet parking are described. A processor of a control system of a vehicle may establish a wireless communication with a remote controller. The processor may provide a stream of video images captured by a camera of the vehicle to the remote controller. The processor may receive a signal from the remote controller. The processor may maneuver the vehicle from one location to another according to the signal.

6 Claims, 4 Drawing Sheets

(56) References Cited

U.S. PATENT DOCUMENTS

| | | | |
|---|---|---|---|
| 2016/0370801 A1* | 12/2016 | Fairfield | G05D 1/0088 |
| 2016/0378110 A1* | 12/2016 | Phillips | G05D 1/0278 |
| | | | 701/2 |
| 2017/0083083 A1* | 3/2017 | Chu | G06F 1/1686 |

* cited by examiner

VIRTUAL REALITY REMOTE VALET PARKING

CROSS-REFERENCE TO RELATED APPLICATIONS

The present disclosure claims priority to, the benefit of, and is a divisional application of U.S. patent application Ser. No. 16/479,393, filed Jul. 19, 2019, which claims priority to and the benefit of PCT/US2017/014980, filed Jan. 25, 2017, which are both hereby incorporated by reference herein in their entireties.

TECHNICAL FIELD

The present disclosure generally relates to autonomous vehicles and, more particularly, to virtual reality remote valet parking.

BACKGROUND

With ever-increasing vehicle ownership and number of vehicles in use, parking has been an issue for many vehicle drivers. Some of the common parking issues may include, for example, inadequate information for drivers, inefficient use of existing parking capacity, excessive vehicles in use, inconvenient parking space, inconvenient parking options, confusing parking policies, lack of sufficient parking at event sites, and low parking turnover rates. As a result, many vehicle drivers tend to waste time looking for parking. Moreover, traffic congestion may occur or become worsened due to vehicle drivers driving vehicles in search of parking space.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1:
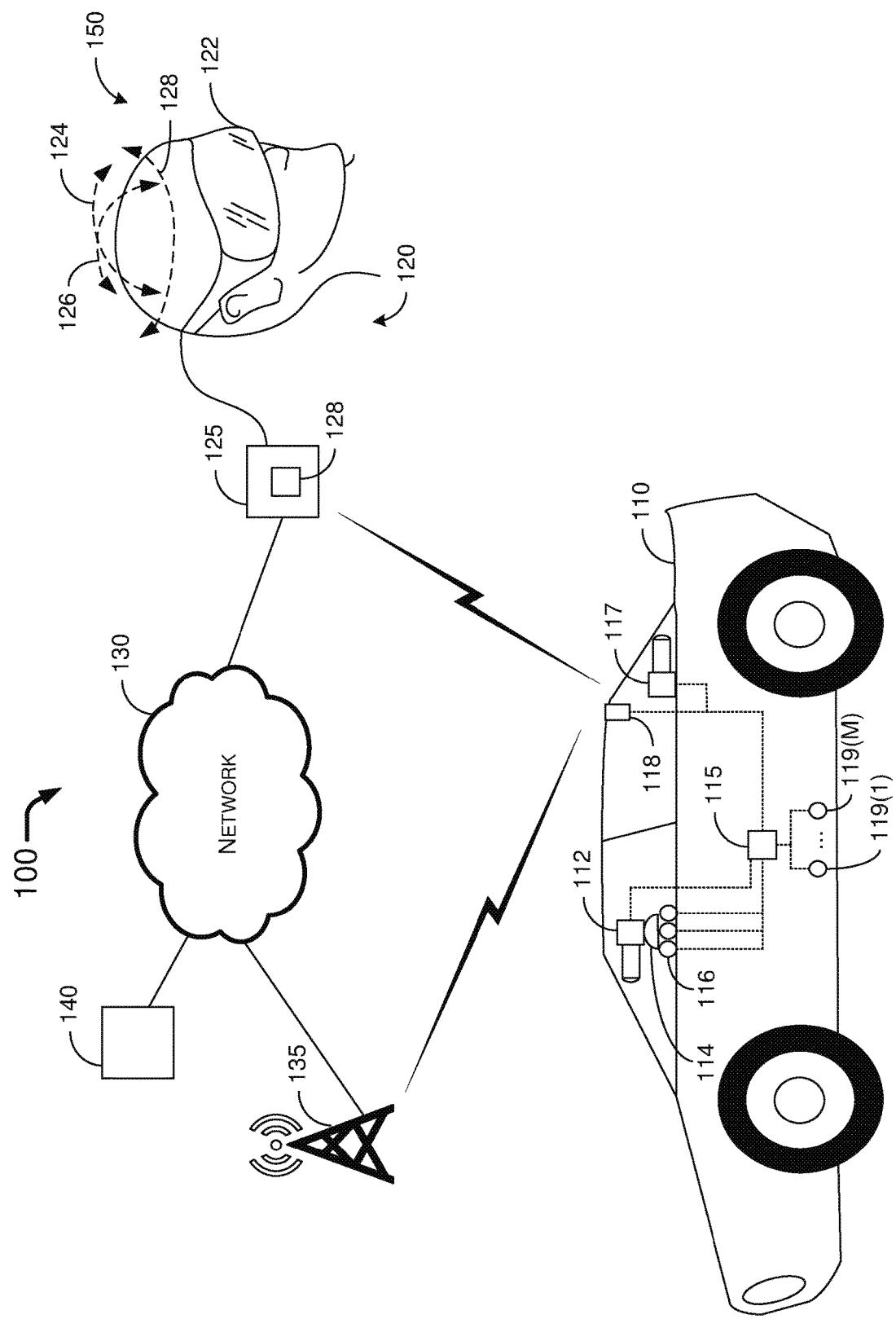
FIG. 1 is a diagram depicting an example scenario in which embodiments in accordance with the present disclosure may be utilized.

FIG. 1 illustrates an example scenario 100 in which embodiments in accordance with the present disclosure may be utilized. To address the aforementioned issue with a remote operator taking over an autonomous vehicle, the present disclosure proposes techniques, schemes, processes and apparatus pertaining to virtual reality autonomous vehicle takeover. Under a proposed scheme, as shown in scenario 100, a vehicle 110 may be equipped, configured, installed or otherwise provided with a control system that includes at least a processor 115, a front-facing camera 112, a rear-facing camera 117, a wireless transceiver 118 and one or more sensors 119(1)-119(M). In some embodiments, vehicle 110 may be a fully-autonomous vehicle. Alternatively, vehicle 110 may be a vehicle capable of operating in a manual mode (e.g., operated by a human driver) and in an autonomous mode without human intervention under normal conditions.

Under scheme 100, a user 150 may utilize a virtual reality-based controller 120 to take over control of vehicle 110. Virtual reality-based controller 120 may include a headset 122 and a computing apparatus 125 communicatively coupled to headset 122. Computing apparatus 125 may include a processor 128, which may control the operations of virtual reality-based controller 120. User 150 may wear headset 122 and communicate with and control operations (e.g., steering and/or speed) of vehicle 110 via a wireless communication. In some embodiments, data transmitted and received via the wireless communication may be in accordance with in accordance with a User Datagram Protocol (UDP). In some embodiments, the wireless communication may be established directly between computing apparatus 125 and wireless transceiver 118 of vehicle 110. Alternatively or additionally, the wireless communication may be established indirectly between computing apparatus 125 and wireless transceiver 118 of vehicle 110 via one or more wired and/or wireless networks (represented by a network 130 in FIG. 1) and a wireless station 135.

Camera 112 may be capable of capturing one or more streams of video images of a front view of vehicle 110, which may be viewed by user 150 wearing headset 122. Similarly, camera 117 may be capable of capturing one or more streams of video images of a rear view of vehicle 110, which may be viewed by user 150 wearing headset 122. Camera 112 may be mounted on a gimbal mount 114 which allows three-dimensional (3D) movement of camera 112. Gimbal mount 114 may be, for example, custom-made by 3D printing. In some embodiments, vehicle 110 may also include one or more actuators 116 and associated servos (not shown) that are capable of adjusting the position of camera 112 by turning, pivoting and/or rotating gimbal mount 114. That is, the one or more actuators 116 may be communicatively coupled to processor 115 to receive signals from processor 115 to adjust the position and/or orientation of camera 112 accordingly.

Processor 115 may receive one or more streams of video images from each of camera 112 and camera 117. Processor 115 may transmit, via wireless transceiver 118, the one or more streams of video images to processor 128 of computing apparatus 125, which may enable virtual reality viewing of the video images by user 150 on headset 122. Thus, user 150 may remotely view real-time video feed from the perspective of camera 112 and camera 117, as if user 150 were the driver of vehicle 110, to remotely take over or control operations of vehicle 110 using a driver setup, a vehicle interior setup, a steering while, one or more gear knobs and/or a pedal set of the virtual reality-based controller 120. For simplicity, the driver setup, vehicle interior setup, steering while, one or more gear knobs and pedal set of the virtual reality-based controller 120 are not shown in FIG. 1. Upon receiving user input from user 150, processor 128 may provide a maneuvering signal to processor 115 to control a steering of vehicle 110, a speed of vehicle 110, or both.

Headset 122 may be equipped, configured or otherwise provided with one or more components (e.g., accelerometer(s) and/or gyroscope(s)) capable of sensing movements and motions of headset 122 to sense and provide signal(s) indicative of a roll 124, a pitch 126, a yaw 128, or a combination thereof with respect to the position of headset 122 (and head of user 150). Upon receiving such signal(s) from headset 122, processor 128 may detect a change in the position and/or motion of headset 122, and may provide a camera adjustment signal to processor 115 to adjust, via the one or more actuators 114, a position of camera 112 (e.g., a roll, a pitch, a yaw, or a combination thereof) in response to the detection. Real-time audio, microphone(s) and/or button(s) may be provided in or on headset 122 to allow user 150 to initiate a pop-up of a rear-view video feed from camera 117 in a corner of a display of headset 122.

With real-time video feed from camera 112 (and camera 117), headset 122 allows user 150 to see a view of camera 112 (and camera 117) in a virtual reality setting as if user 150 were actually driving vehicle 110. As the position of headset 122 is captured without relation to a mounted sensor, user 150 may be able to reset camera 110 to a default position (e.g., front-facing pose). For instance, processor 128 may receive a user input for resetting or otherwise returning camera 110 to its default position and, accordingly, may provide a reset signal to processor 115 to adjust a position of camera 112 to point camera 112 in a front-facing direction with respect to vehicle 110 according to the reset signal.

The one or more sensors 119(1)-119(M) may be capable of sensing one or more aspects or parameters with respect to vehicle 110 in which apparatus 200 is installed, and generate sensor data representative of a result of the sensing. For instance, the one or more sensors 119(1)-119(M) may include one or more accelerometers, one or more gyroscopes, one or more pressure sensors, one or more piezoelectric sensors, one or more microphones and/or one or more image sensors. The one or more sensors 119(1)-119(M) may detect various conditions with respect to vehicle 110 such as, for example and without limitation, whether vehicle 110 is moving, whether vehicle 110 is not moving, whether vehicle 110 is occupied by occupant(s), and whether a human driver has released control of vehicle 110 to autonomous driving or remote control of vehicle 110.

Under scheme 100, virtual reality-based controller 120 may be communicatively connected to one or more parking management systems (represented by a parking management server 140 in FIG. 1) via network 130 to receive parking information about one or more parking lots, which may enable the provision of a remote valet service to vehicles such as vehicle 110. The parking information received from server 140 may include information of one or more parking lots as well as vacancy (e.g., availability of unoccupied parking space) at each of the one or more parking lots. The remote valet service allows the driver of vehicle 110 to stop vehicle 110 (e.g., at road side or near a parking lot) and let the remote valet service take control of vehicle 110. The remote valet driver (e.g., user 150) may use a parking system program or app, or obtain parking information from server 140, to find one or more unoccupied parking spaces at one or more parking lots near vehicle 110. The remote valet driver may then park vehicle 110 by remotely controlling vehicle 110 to maneuver vehicle 110 to move from its current location to one of the one or more unoccupied parking spaces at a parking lot.

Under scheme 100, during the rendering of the remote valet service, processor 115 may continuously or periodically receive sensor data from the one or more sensors 119(1)-119(M) to determine whether a predefined situation with respect to vehicle 110 exists based on the sensor data. The predefined situation may include, for example and without limitation, the maneuvering of vehicle 110 by remote valet driver including one or more unsafe actions (e.g., driving exceedingly fast and/or driving too close to surrounding vehicle(s) and/or pedestrian(s)). In response to determining that the predefined situation exists, processor 115 may perform at least one operation of one or more operations. The one or more operations may include notifying the remote controller about the situation and/or limiting at least one aspect of maneuvering of the vehicle by the remote controller. For instance, processor 115 may apply a brake to slow down vehicle 110, limit an amount of steering by the remote valet driver to avoid collision, or take any suitable actions to avoid or mitigate a crash or collision.

Figure 2:
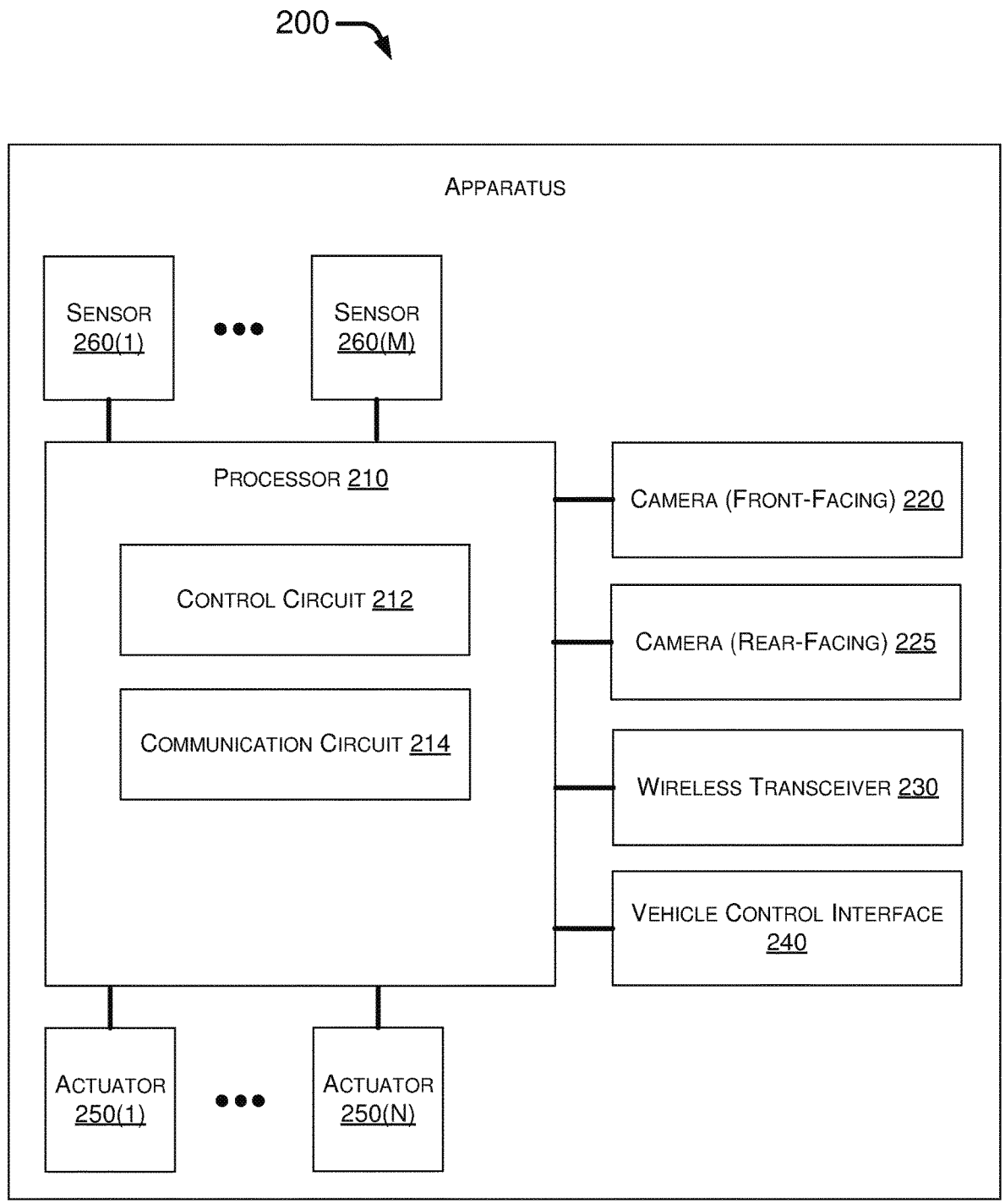
FIG. 2 is a block diagram depicting an example apparatus in accordance with an embodiment of the present disclosure.

FIG. 2 illustrates an example apparatus 200 in accordance with an embodiment of the present disclosure. Apparatus 200 may perform various functions related to techniques, schemes, methods and systems described herein pertaining to virtual reality remote valet parking, including those described above with respect to scenario 100 as well as those described below with respect to process 300 and process 400. Apparatus 200 may be implemented in vehicle 110 in scenario 100 to effect various embodiments in accordance with the present disclosure. That is, in some embodiments, apparatus 200 may be an example implementation of the control system of vehicle 110. Apparatus 200 may include one, some or all of the components shown in FIG. 2. Apparatus 200 may also include one or more other components not be pertinent to various embodiments of the present disclosure and, thus, such component(s) is/are not shown in FIG. 2 and a description thereof is not provided herein in the interest of brevity.

Apparatus 200 may include at least a processor 210, which may include a control circuit 212 and a communication circuit 214. Processor 210 may be an example implementation of processor 115 of vehicle 110. Processor 210 may be implemented in the form of one or more single-core processors, one or more multi-core processors, or one or more complex instruction set computing (CISC) processors. Thus, even though a singular term "a processor" is used herein to refer to processor 210, processor 210 may include multiple processors in some embodiments and a single processor in other embodiments in accordance with the present disclosure. In another aspect, processor 210 may be implemented in the form of hardware (and, optionally, firmware) with electronic components including, for example and without limitation, one or more transistors, one or more diodes, one or more capacitors, one or more resistors and/or one or more inductors that are configured and arranged to achieve specific purposes in accordance with the present disclosure. In other words, in at least some embodiments, processor 210 is a special-purpose machine specifically designed, arranged and configured to perform specific tasks including virtual reality remote valet parking in accordance with various embodiments of the present disclosure.

In some embodiments, apparatus 200 may include a front-facing camera 220 and a rear-facing camera 225 each capable of capturing one or more streams of video images. Each of camera 220 and camera 225 may be communicatively coupled to processor 210 to provide video signals of one or more streams of video images captured by camera 220 and camera 225. In some embodiments, camera 220 may be mounted on a gimbal mount (e.g., gimbal mount 114) which allows 3D movement of camera 220. In some embodiments, apparatus 200 may also include one or more actuators 250(1)-250(N) that are capable of adjusting the position of camera 220 by turning, pivoting and/or rotating the gimbal mount on which camera 220 is mounted. That is, the one or more actuators 250(1)-250(N) may be communicatively coupled to processor 210 to receive signals from processor 210 to adjust the position and/or orientation of camera 220 accordingly.

In some embodiments, apparatus 200 may include a wireless transceiver 230 communicatively coupled to processor 210. Wireless transceiver 230 may be capable of establishing wireless communications with one or more networks (e.g., network 130) and/or a remote controller (e.g., virtual reality-based controller 120). In some embodiments, the wireless transceiver 230 may be capable of transmitting and receiving data in accordance with the UDP.

In some embodiments, apparatus 200 may include a vehicle control interface 240 communicatively coupled to processor 210 such that processor 210 may autonomously control, operate or otherwise maneuver the vehicle (e.g., vehicle 110) without human input, control and/or intervention. Vehicle control interface 240 may communicate with necessary mechanical, electrical, pneumatic and/or hydraulic components of the vehicle for the control and/or maneuvering of the vehicle. Thus, upon receiving signals and/or commands from processor 210, vehicle control interface 240 may actuate, activate, control and/or operate one or more parts of the vehicle (e.g., to drive and maneuver the vehicle).

In some embodiments, apparatus 200 may include one or more sensors 260(1)-260(M). The one or more sensors 260(1)-260(M) may be capable of sensing one or more aspects or parameters with respect to the vehicle in which apparatus 200 is installed, and generate sensor data representative of a result of the sensing. For instance, the one or more sensors 260(1)-260(M) may include one or more accelerometers, one or more gyroscopes, one or more pressure sensors, one or more piezoelectric sensors, one or more microphones and/or one or more image sensors. The one or more sensors 260(1)-260(M) may detect various conditions with respect to the vehicle such as, for example and without limitation, whether the vehicle is moving, whether the vehicle is not moving, whether the vehicle is occupied by occupant(s), and whether a human driver has released control of the vehicle to autonomous driving or remote control of the vehicle.

In some embodiments, communications between two of more components of apparatus 200 may be wireless communications in accordance with suitable protocol(s), standard(s) and/or specification(s). For instance, the communications between processor 210 and one or more of camera 220, camera 225, wireless transceiver 230, vehicle control interface 240, the one or more actuators 250(1)-250(N) and the one or more sensors 260(1)-260(M) may be based on one or more Wi-Fi technologies in accordance with the Institute of Electrical and Electronics Engineers (IEEE) 802.11 standards. Additionally or alternatively, other wireless technologies such as Bluetooth, Near-Field Communication (NFC), infrared and/or ultrasound may be utilized.

Communication circuit 214 may be capable of establishing, via the wireless transceiver 230, a wireless communication with a remote controller (e.g., processor 128 of computing apparatus 125 of virtual reality-based controller 120). Communication circuit 214 may be capable of receiving a signal from the remote controller. Control circuit 212 may be capable of providing, via the wireless transceiver 230, the stream of video images captured by camera 220 to the remote controller. Control circuit 212 may also be capable of maneuvering the vehicle to move from one location to another according to the signal.

In some embodiments, communication circuit 212 may be capable of determining an existence of a condition with respect to the vehicle and notifying, via the wireless transceiver 230, the remote controller about the condition. In some embodiments, the receiving of the signal may be a result of notifying the remote controller about the condition. In some embodiments, the condition may include stopping of the vehicle, releasing of control of the vehicle by a human driver of the vehicle, or both.

In some embodiments, communication circuit 214 may be capable of receiving, via the wireless transceiver 230, a camera adjustment signal from the remote controller. In such cases, control circuit 212 may be capable of controlling the one or more actuators to adjust the position of camera 220 according to the camera adjustment signal.

In some embodiments, control circuit 212 may be capable of receiving the sensor data from the one or more sensors 260(1)-260(M). Additionally, control circuit 212 may also be capable of determining that a situation with respect to the vehicle exists based on the sensor data. Moreover, control circuit 212 may be capable of performing at least one operation of one or more operations responsive to the determining. For instance, the situation may include the maneuvering of the vehicle by the remote controller including one or more unsafe actions. In such cases, control circuit 212 may notify, via the wireless transceiver 230, the remote controller about the situation. Control circuit 212 may also control the vehicle control interface 240 to limit at least one aspect of maneuvering of the vehicle by the remote controller (e.g., controlling vehicle control interface 240 to apply a brake to slow down the vehicle, limiting an amount of steering by the remote controller to avoid collision, or taking any suitable actions to avoid or mitigate a crash or collision).

Figure 3:
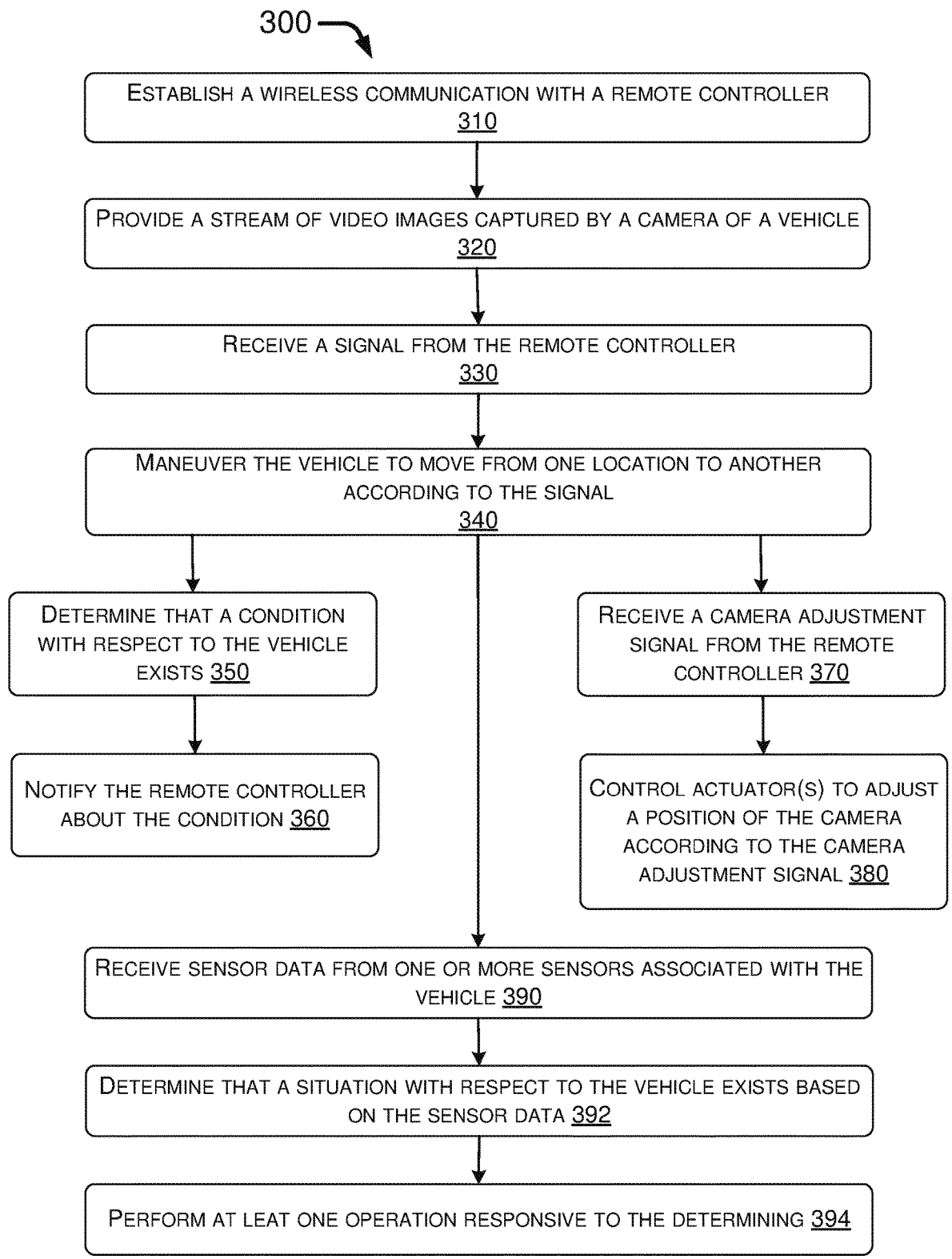
FIG. 3 is a flowchart depicting an example process in accordance with an embodiment of the present disclosure.

FIG. 3 illustrates an example process 300 in accordance with an embodiment of the present disclosure. Process 300 may include one or more operations, actions, or functions shown as blocks such as 310, 320, 330, 340, 350, 360, 370, 380, 390, 392 and 394. Although illustrated as discrete blocks, various blocks of process 300 may be divided into additional blocks, combined into fewer blocks, or eliminated, depending on the desired implementation. Process 300 may be implemented in scenario 100 and/or by apparatus 200. For illustrative purposes and without limitation, the following description of process 300 is provided in the context of scenario 100. Process 300 may begin with block 310.

At 310, process 300 may involve processor 115 of vehicle 110 establishing a wireless communication with a remote controller (e.g., processor 128 of computing apparatus 125 of virtual reality-based controller 120). Process 300 may proceed from 310 to 320.

At 320, process 300 may involve processor 115 providing a stream of video images captured by a camera of the vehicle (e.g., camera 112 of vehicle 110) to the remote controller. Process 300 may proceed from 320 to 330.

At 330, process 300 may involve processor 115 receiving a signal from the remote controller. Process 300 may proceed from 330 to 340.

At 340, process 300 may involve processor 115 maneuvering vehicle 110 to move from one location to another according to the signal. Process 300 may proceed from 340 to 350, 370 and/or 390.

At 350, process 300 may involve processor 115 determining that a condition with respect to vehicle 110 exists. In some embodiments, the condition may include stopping of vehicle 110, releasing of control of vehicle 110 by a human driver of vehicle 110, or both. Process 300 may proceed from 350 to 360.

At 360, process 300 may involve processor 115 notifying the remote controller about the condition. In some embodiments, the receiving of the maneuvering signal may be a result of processor 115 notifying the remote controller about the condition.

At 370, process 300 may involve processor 115 receiving a camera adjustment signal from the remote controller. Process 300 may proceed from 370 to 380.

At 380, process 300 may involve processor 115 controlling one or more actuators 116 to adjust a position of camera 112 according to the camera adjustment signal. In some embodiments, in controlling the one or more actuators 116 to adjust the position of camera 112, process 300 may involve processor 115 adjusting a roll, a pitch, a yaw, or a combination thereof with respect to the position of camera 112.

At 390, process 300 may involve processor 115 receiving sensor data from one or more sensors associated with vehicle 110 (e.g., one or more sensors 119(1)-119(M)). Process 300 may proceed from 390 to 392.

At 392, process 300 may involve processor 115 determining that a situation with respect to vehicle 110 exists based on the sensor data. Process 300 may proceed from 392 to 394.

At 394, process 300 may involve processor 115 performing at least one operation of one or more operations responsive to the determining. For instance, the situation may include the maneuvering of vehicle 110 by the remote controller including one or more unsafe actions. In such cases, process 300 may involve processor 115 notifying the remote controller about the situation. Additionally, process 300 may involve processor 115 limiting at least one aspect of maneuvering of vehicle 110 by the remote controller.

In some embodiments, the providing of the stream of video images, the receiving of the signal, or both, may be done in accordance with the UDP.

Figure 4:
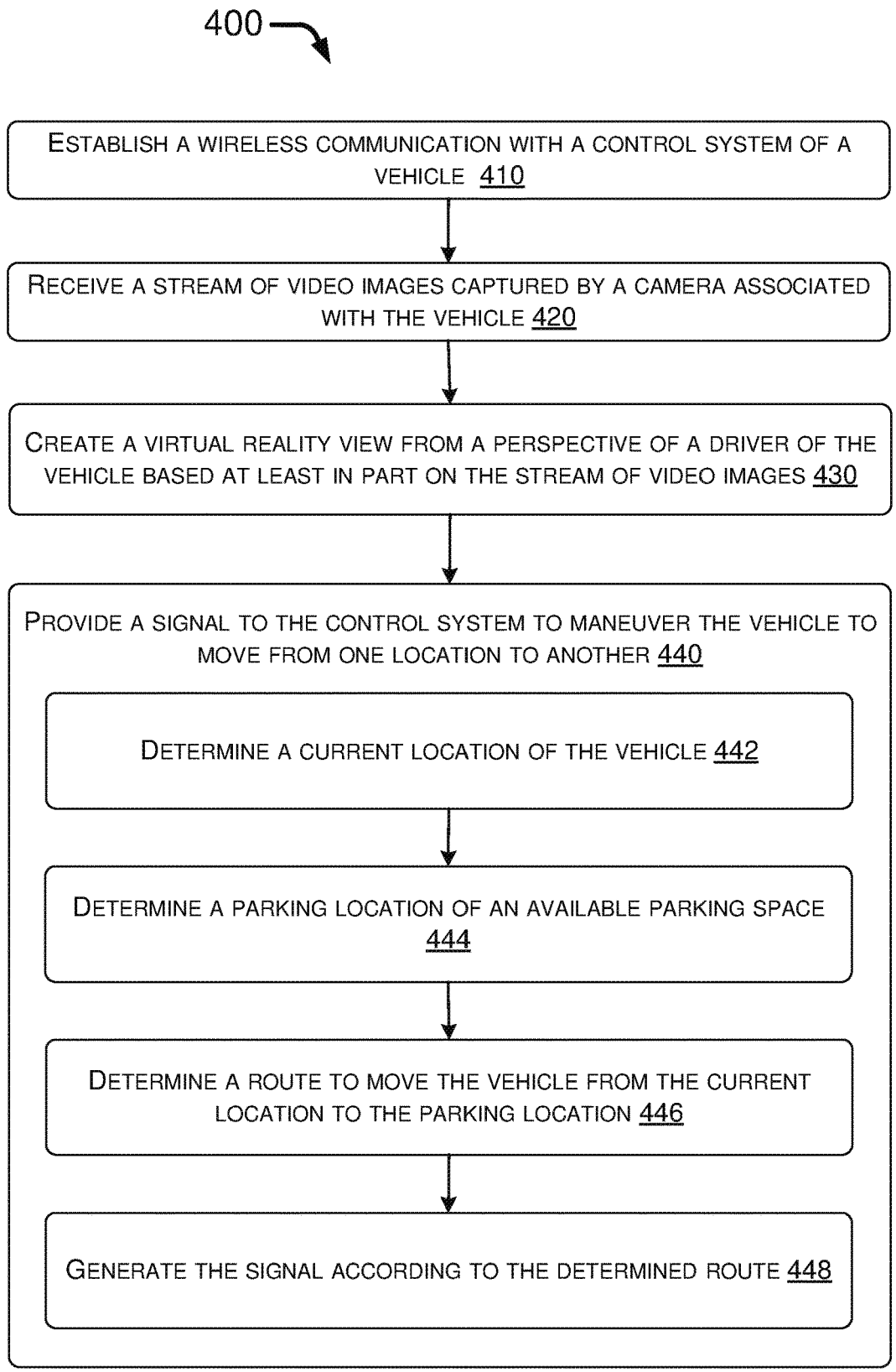
FIG. 4 is a flowchart depicting an example process in accordance with an embodiment of the present disclosure.

FIG. 4 illustrates an example process 400 in accordance with an embodiment of the present disclosure. Process 400 may include one or more operations, actions, or functions shown as blocks such as 410, 420, 430 and 440, as well as sub-blocks 442, 444, 446 and 448. Although illustrated as discrete blocks, various blocks of process 400 may be divided into additional blocks, combined into fewer blocks, or eliminated, depending on the desired implementation. Process 400 may be implemented in scenario 100 and/or by apparatus 200. For illustrative purposes and without limitation, the following description of process 400 is provided in the context of scenario 100. Process 400 may begin with block 410.

At 410, process 400 may involve processor 128 of a virtual reality-based controller 120 establishing a wireless communication with a control system of a vehicle (e.g., processor 115 of vehicle 110). Process 400 may proceed from 410 to 420.

At 420, process 400 may involve processor 128 receiving a stream of video images captured by a camera associated with vehicle 110 (e.g., camera 112 of vehicle 110). Process 400 may proceed from 420 to 430.

At 430, process 400 may involve processor 128 creating a virtual reality view (e.g., on headset 122 for user 120) from a perspective of a driver of vehicle 110 based at least in part on the stream of video images. Process 400 may proceed from 430 to 440.

At 440, process 400 may involve processor 128 providing a signal to processor 115 of the control system to maneuver vehicle 110 to move from one location to another. In providing the signal to processor 115 to maneuver vehicle 110 from one location to another, process 400 may involve processor 128 performing a number of operations as shown in sub-blocks 442, 444, 446 and 448.

At 442, process 400 may involve processor 128 determining a current location of vehicle 110. Process 400 may proceed from 442 to 444.

At 444, process 400 may involve processor 128 determining a parking location of an available parking space. Process 400 may proceed from 444 to 446.

At 446, process 400 may involve processor 128 determining a route to move vehicle 110 from the current location to the parking location. Process 400 may proceed from 446 to 448.

At 448, process 400 may involve processor 128 generating the signal according to the determined route.

In some embodiments, the receiving of the stream of video images, the providing of the signal to the control system, or both, may be in accordance with the UDP.

In some embodiments, in providing the signal to the control system, process 400 may involve processor 128 receiving a notification from the control system indicating an existence of a condition with respect to vehicle 110. Moreover, process 400 may involve processor 128 providing the signal to the control system responsive to receiving the notification. In some embodiments, the condition may include stopping of vehicle 110, releasing of control of vehicle 110 by a human driver of vehicle 110, or both.

In some embodiments, process 400 may involve processor 128 detecting a change in position of a headset (e.g., a roll, a pitch, a yaw, or a combination thereof with respect to the position of headset 122) associated with the virtual reality-based controller. Additionally, process 400 may involve processor 128 providing a camera adjustment signal to the control system to adjust a position of camera 112 associated with vehicle 110 responsive to the detecting. In some embodiments, the adjustment of camera 112 may involve adjusting a roll, a pitch, a yaw, or a combination thereof with respect to the position of camera 112.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:
1. A method, comprising:
  establishing, by a processor of a virtual reality-based controller, a wireless communication with a control system of a vehicle;
  receiving, by the processor, a stream of video images captured by a camera associated with the vehicle;
  creating, by the processor, a virtual reality view of from a perspective of a driver of the vehicle based at least in part on the stream of video images; and providing, by the processor, a signal to the control system to maneuver the vehicle from one location to another.

2. The method of claim 1, wherein the receiving of the stream of video images, the providing of the signal to the control system, or both, is in accordance with a User Datagram Protocol (UDP).

3. The method of claim 1, wherein the providing of the signal to the control system to maneuver the vehicle from one location to another comprises:
   determining a current location of the vehicle;
   determining a parking location of an available parking space;
   determining a route to move the vehicle from the current location to the parking location; and
   generating the signal according to the determined route.

4. The method of claim 1, wherein the providing of the signal to the control system comprises:
   receiving, by the processor, a notification from the control system indicating an existence of a condition with respect to the vehicle; and
   providing, by the processor, the signal to the control system responsive to receiving the notification.

5. The method of claim 4, wherein the condition comprises stopping of the vehicle, releasing of control of the vehicle by a human driver of the vehicle, or both.

6. The method of claim 1, further comprising:
   detecting, by the processor, a change in position of a headset associated with the virtual reality-based controller; and
   providing, by the processor, a camera adjustment signal to the control system to adjust a position of the camera associated with the vehicle responsive to the detecting.

* * * * *